United States Patent
Takada et al.

[11] Patent Number: 6,003,311
[45] Date of Patent: Dec. 21, 1999

[54] STATOR BLADE OF TORQUE CONVERTER

[75] Inventors: Yukiyoshi Takada, Osaka; Takeshi Kawamoto, Daito; Takashi Kawamura, Ikoma, all of Japan

[73] Assignee: Exedy Corporation, Neyagawa, Japan

[21] Appl. No.: 09/164,643

[22] Filed: Oct. 1, 1998

[30] Foreign Application Priority Data

Oct. 14, 1997 [JP] Japan .................................... 9-280692

[51] Int. Cl.⁶ .................................................. F16D 33/00
[52] U.S. Cl. ........................................ 60/362; 416/197 C
[58] Field of Search ............................ 60/361, 362, 365; 416/197 C

[56] References Cited

U.S. PATENT DOCUMENTS

| | | | |
|---|---|---|---|
| 1,927,944 | 9/1933 | Lysholm | 416/126 |
| 2,755,628 | 7/1956 | Mamo | 60/362 X |
| 4,180,978 | 1/1980 | Maddock | 60/362 X |
| 4,608,823 | 9/1986 | Maze | 60/361 |

FOREIGN PATENT DOCUMENTS 1900650  8/1970  Germany ................................ 60/362
9-14388  1/1997  Japan .

*Primary Examiner*—John E. Ryznic
*Attorney, Agent, or Firm*—Shinjyu An Intellectual Property Firm

[57] ABSTRACT

A stator blade 13 has a blade tip 14, a blade trailing edge 15, a back 16 and a face 17. The blade tip 14 is an edge of the peripheral surface of the stator blade 13 near the turbine. The blade trailing edge 15 is an edge of the peripheral surface of the stator blade 13 near the impeller. The back 16 is a portion of the peripheral surface of the stator blade 13 extending between the blade tip 14 and the blade trailing edge 15 and opposed to the impeller 4, and has a streamline section. The face 17 is a portion of the peripheral surface of the stator blade 13 extending between the blade tip 14 and the blade trailing edge 15 and opposed to the turbine 5, and is formed of a streamline portion 17a and a plane portion 17b located near the blade tip 14. The shape of the stator blade 13 is such that a capacity coefficient (Cf) of a torque converter is lower when a speed ratio (e) is 0, and thereby improving fuel consumption during idling.

6 Claims, 8 Drawing Sheets

STATOR BLADE OF TORQUE CONVERTER

BACKGROUND OF THE INVENTION

A. Field of the Invention

The present invention relates to a stator blade of a stator which is disposed between an impeller and a turbine in a torque converter.

B. Description of the Background Art

A torque converter is a device which includes an impeller, a turbine and a stator, and transmits torque through a working fluid which fills the inner spaces defined within the torque convertor. In an outer peripheral portion of the torque converter, the working fluid flows from the impeller to turbine, and in an inner peripheral portion of the torque converter the working fluid flows from the turbine to the impeller through the stator.

The stator is a member disposed between the impeller and the turbine, and is fixed to a stator shaft via a one-way clutch. The stator shaft is typically engaged with a fixed, non-rotating portion of a transmission housing. The stator is typically made of molded resin, aluminum alloy or the like, and is basically formed with an annular shell, an annular core and stator blades which extend between the shell and the core. The stator blades are disposed at circumferentially spaced positions, respectively, and extend from the shell at the radially inner position to the core at the radially outer position for the purpose of, e.g., controlling a direction of the working fluid returning from the turbine toward the impeller.

During idling of a vehicle provided with the torque converter, the impeller coupled to a crank shaft of an engine continuously rotates while rotation of the turbine is being restricted. Even during idling, therefore, the engine operates under a load, which increases a fuel consumption.

The fuel consumption can be improved by lowering a capacity coefficient (Cf) during idling, i.e., when a speed ratio (e) at a rotation speed (Ni) of the impeller to a rotation speed (No) of the turbine is 0. The capacity coefficient (Cf) is obtained by dividing the torque (Ti) of the impeller by the square of the rotation speed (Ni) of the impeller. If the capacity coefficient (Cf) is low, only a small energy is required for rotating the impeller during idling so that the fuel consumption of the vehicle during idling is improved.

SUMMARY OF THE INVENTION

An object of the invention is to provide a stator blade having a form which lowers a capacity coefficient (Cf) of the torque converter when a speed ratio (e) is 0, and thereby improving fuel consumption during idling.

In accordance with one aspect of the present invention, a stator blade of a stator of a torque converter includes a blade tip, a blade trailing edge, a back surface and a face. The stator is arranged between an impeller and a turbine the torque converter. The blade tip is defined at an edge of a peripheral surface of the stator blade near the turbine. The blade trailing edge is defined at an edge of the peripheral surface of the stator blade near the impeller. The back surface extends between the blade tip and the blade trailing edge and for the most part faces the impeller. The back surface has a convex streamline contour. The face of the stator blade extends between the blade tip and the blade trailing edge and faces the turbine. The face is formed of a concave streamline portion and a planar portion located near the blade tip. Specifically, the planar portion is defined between the blade tip and the concave streamline portion.

When a speed ratio (e) is 0, working fluid of the torque converter flows at a large angle with respect to a plane extending between the blade tip and the blade trailing edge, and collides with the stator blade when flowing from the turbine toward the impeller. If the stator blade has a conventional form that includes a convex streamline surface at a leading edge thereof proximate the blade tip facing the turbine, the working fluid would flow toward the impeller along the streamline form after collision with the stator blade. In contrast to this, the face of the stator blade of the present invention has the planar portion near the blade tip, and therefore an impact loss of the working fluid colliding with the face is larger than that of the conventional structure. Accordingly, a circulation flow speed of the working fluid decreases, and a capacity coefficient (Cf) with a speed ratio (e) of 0 is small. Thereby, a vehicle provided with the torque converter which has the stator blade of the present invention can provide an improved fuel consumption during idling.

For improving an efficiency of the torque converter, the conventional stator blade generally has a streamline portion which reduces a loss with respect to flow of the working fluid in middle and high speed ratio ranges. However, the form which can reduce the capacity coefficient (Cf) in a low speed ratio range may disturb the flow in the high speed ratio range, in which case the loss increases and the efficiency of the torque converter decreases. According to the stator blade of the present invention, the plane portion is formed only in the face opposed to the turbine. In the middle and high speed ratio ranges, therefore, it is possible to minimize the disturbance in the flow of the working fluid, and the capacity coefficient (Cf) can be equal to or larger than that in the prior art so that the efficiency can be maintained.

In accordance with another aspect of the present invention, a stator blade of a stator of a torque converter includes a blade tip, a blade trailing edge, a back surface and a face. The stator is arranged between an impeller and a turbine in a torque converter. The blade tip is an edge of a peripheral surface of the stator blade near the turbine. The blade trailing edge is an edge of the peripheral surface of the stator blade near the impeller. The back surface extends between the blade tip and the blade trailing edge and is located a negative pressure side of the stator. The back surface has a convex streamline contour. The face extends between the blade tip and the blade trailing edge and located on a positive pressure side of the stator. The face is formed with a concave streamline portion and a planar portion located near the blade tip.

When a speed ratio (e) is 0, working fluid of the torque converter flows at a large angle with respect to a plane extending between the blade tip and the blade trailing edge, and collides with the stator blade when flowing from the turbine toward the impeller. If the stator blade had a conventional shape and contour including a streamline face near the blade tip had a streamline convex contour facing the positive pressure side of the stator, the working fluid would flow toward the negative pressure side along the streamline contour after collision with the stator blade. In contrast to this, the face of the stator blade of the present invention has the planar portion near the blade tip, and therefore an impact loss of the working fluid colliding with the face is larger than that of the conventional structure. Accordingly, a circulation flow speed of the working fluid decreases, and a capacity coefficient (Cf) with a speed ratio (e) of 0 is small. Thereby, a vehicle provided with the torque converter which has the stator blade of this aspect can provide an improved fuel consumption during idling.

For improving an efficiency of the torque converter, the conventional stator blade generally has a streamline section which reduces a loss with respect to flow of the working fluid in middle and high speed ratio ranges. However, the form which can reduce the capacity coefficient (Cf) in a low speed ratio range may disturb the flow in the high speed ratio range, in which case the loss increases and the efficiency of the torque converter decreases.

For example, if the stator blade has plane portions which extend on the positive and negative pressure sides from the blade tip, respectively, the direction of flow of the working fluid in the middle and high speed ratio ranges forms a large angle with respect to the plane portion near the blade tip so that large disturbance occurs in the flow of the working fluid in the middle and high speed ratio ranges, which lowers the efficiency of the torque converter. However, according to the stator blade of the present invention, the planar portion is formed only in the face opposed to the positive pressure side. In the middle and high speed ratio ranges, therefore, it is possible to minimize the disturbance in the flow of the working fluid, and the capacity coefficient (Cf) can be equal to or larger than that in the prior art so that the efficiency can be maintained.

Preferably, the planar surface of the face of the stator blade defines an angle in a range from 25 degrees to 70 degrees with respect to an axis of rotation of the torque converter.

If the angle between the axis of rotation of the torque converter and the plane portion of the face of the stator blade is in a range from 25 degrees to 70 degrees, the capacity coefficient (Cf) with the speed ratio (e) of 0 can be lower than that in the prior art, and it is also possible to suppress disturbance in flow of the working fluid in the middle and high speed ratio ranges. For further improvement of the torque converter performance, the angle between the rotation axis of the torque converter and the plane portion of the face of the stator blade is desirably in a range from 32 degrees to 61 degrees.

Preferably, the face of the stator blade defines a chord length (L) and the planar surface defines a width (W) defining the following relationship:

$$0.04 \leq (W/L) \leq 0.4.$$

The chord length (L) is a length between the blade tip and the blade trailing edge, and the width (W) of the planar portion is a width measured in a direction perpendicular to the radial direction of the rotation axis of the torque converter.

If the width (W) of the plane portion is excessively small, the capacity coefficient (Cf) with the speed ratio (e) of 0 is not sufficiently lowered. If the width (W) of the planar portion is excessively large, such disadvantages arise that the disturbance in flow of the working fluid increases in the middle speed ratio range, the capacity coefficient (Cf) in the middle speed ratio range lowers, and the engine speed increases. In view of the foregoing, the width (W) of the planar portion in this aspect is restricted in the foregoing range. Thereby, lowering of the capacity coefficient (Cf) can be prevented when the speed ratio (e) is 0, and also the capacity coefficient (Cf) can be sufficiently ensured in the middle speed ratio range.

In accordance with yet another aspect of the present invention, a torque converter includes a front cover, an impeller, a turbine and a stator. The front cover is connected to an output member of an engine. The impeller is fixed to the front cover, and forms a working fluid chamber together with the front cover. The turbine is arranged in the working fluid chamber, is opposed to the impeller and is coupled to a member on a transmission side. The stator has stator blades each having the same structure as is in the various aspects of the present invention described above. The stator arranged between an inner peripheral portion of the impeller and an inner peripheral portion of the turbine.

The foregoing and other objects, features, aspects and advantages of the present invention will become more apparent from the following detailed description, when taken in conjunction with the accompanying drawings.

DESCRIPTION OF THE PREFERRED EMBODIMENTS

Figure 1:
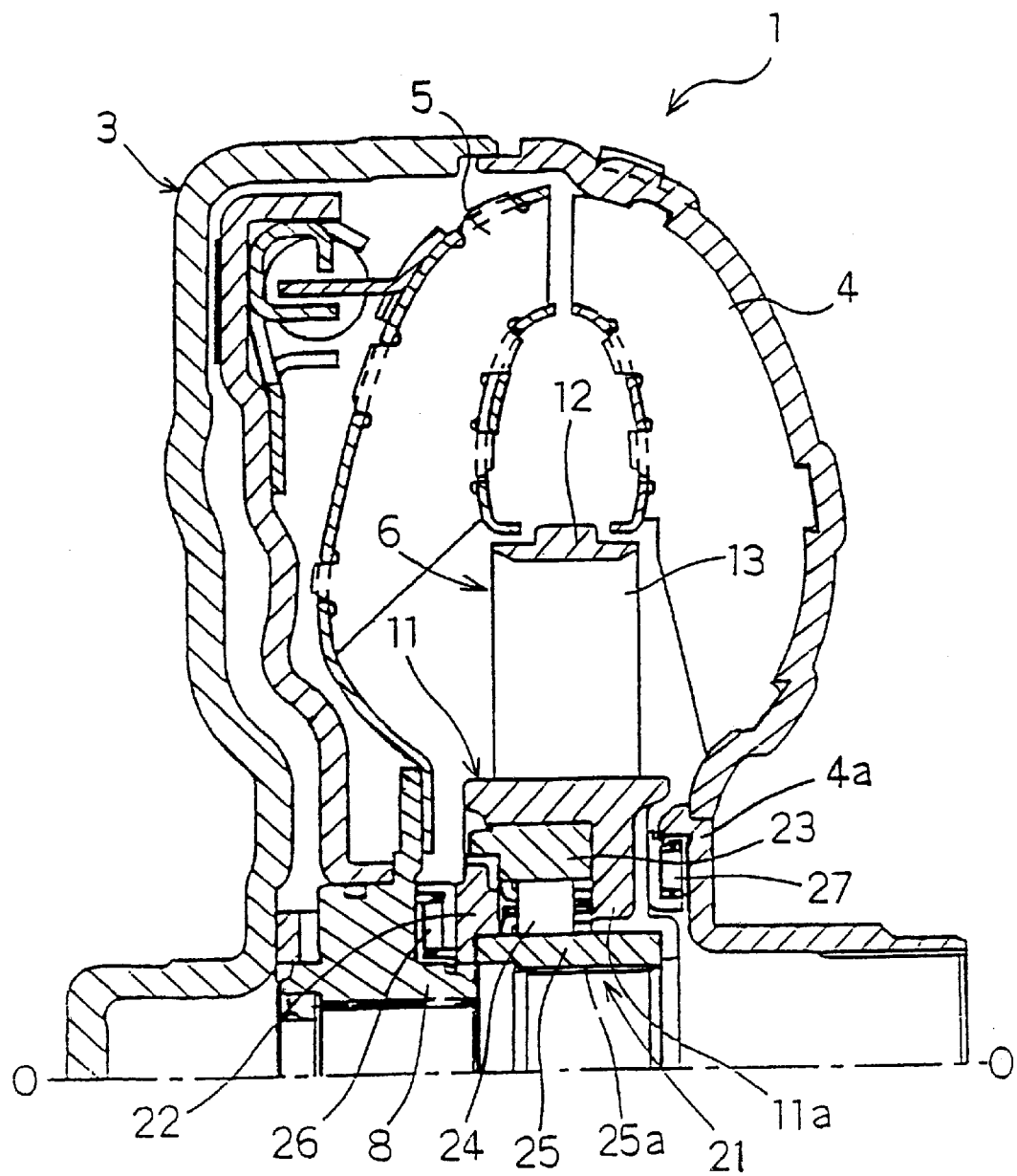
FIG. 1 is a schematic cross section of a torque converter provided with a stator having stator blades in accordance with one embodiment of the present invention.

FIG. 1 shows a torque converter 1 provided with a stator 6 in accordance with one embodiment of the present invention. In FIG. 1, an axis O—O represents a rotation axis of the torque converter 1, and an engine (not shown) and a transmission (not shown) are disposed on the left and right sides in FIG. 1, respectively.

The torque converter 1 is basically a device for transmitting torque from a crankshaft of an engine to a main drive shaft of a transmission. The torque converter 1 is formed of a front cover 3 having an outer peripheral portion connected to the crankshaft, and a torque converter main unit including three kinds of vane wheels, an impeller 4, a turbine 5 and a stator 6. The front cover 3 and the impeller 4 are welded together at outer peripheral portions thereof defining a working fluid chamber therebetween.

Torque supplied from the crankshaft to the front cover 3 is transmitted to the main drive shaft of the transmission via the turbine 5 and the working fluid which flows from the impeller 4 to the turbine 5. When the engine rotates, the working fluid is circulated to a radial outer portion of the torque converter by the impeller 4 and directed toward the turbine 5. The working fluid engages the turbine 5 and torque is transmitted. However, as the working fluid leave a radial inner portion of the turbine 5 and heads back toward a radial inner portion of the impeller 4, the direction of movement of the fluid is in a direction opposing rotation of the impeller 4 limiting efficiency of the torque converter. The stator 6 is provided for suppressing this backward flow of working fluid from the turbine 5. The stator 6 changes the direction of flow of the working fluid that is pushed back by the turbine 5, into a direction of flow that is in the same rotating direction as the impeller 4, and thereby improving the torque transmission efficiency of the torque converter 1.

Figure 2:
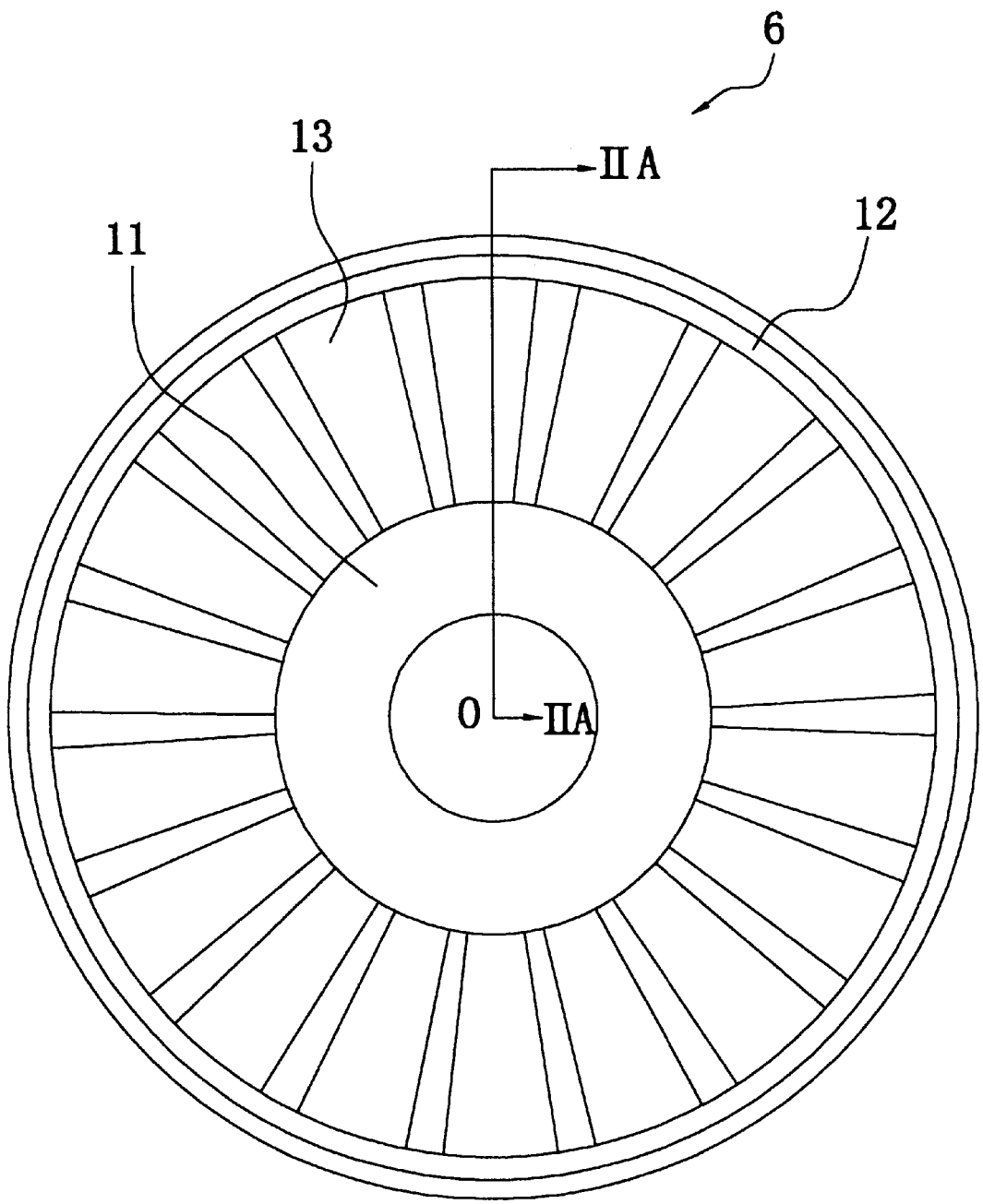
FIG. 2 is a plan of the stator shown removed from the torque converter depicted in FIG. 1.
Figure 2A:
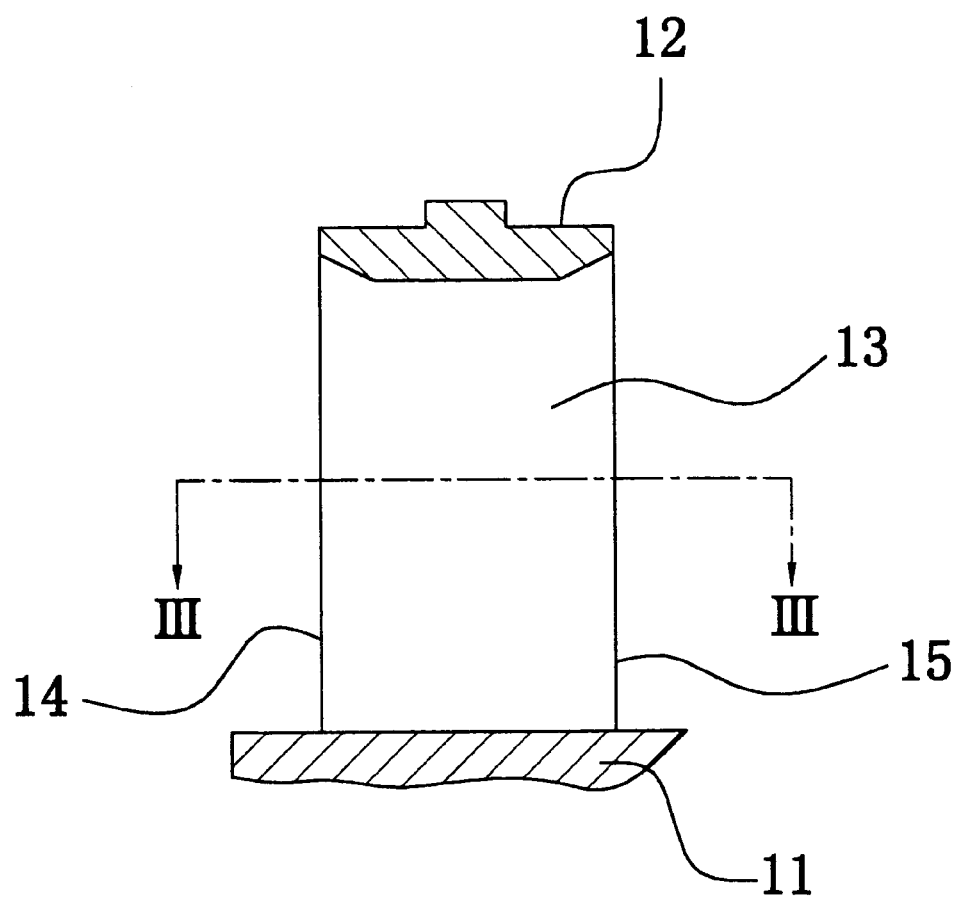
FIG. 2A is a cross section view of the stator taken along the line IIA—IIA in FIG. 2.

As shown in FIGS. 1 and 2, the stator 6 generally includes an annular shell 11, an annular core 12 and a plurality of stator blades 13, which are integrally made of any of a variety of materials, such as a molded aluminum alloy or resin.

The shell 11 is typically engaged with a stator shaft (not shown) which is fixed to a housing of the transmission via a stator support. The shell 1 is provided at its inner peripheral portion with a thrust support 11a. The stator support structure is described below.

The core 12 is arranged radially outside the shell 11.

Figure 3:
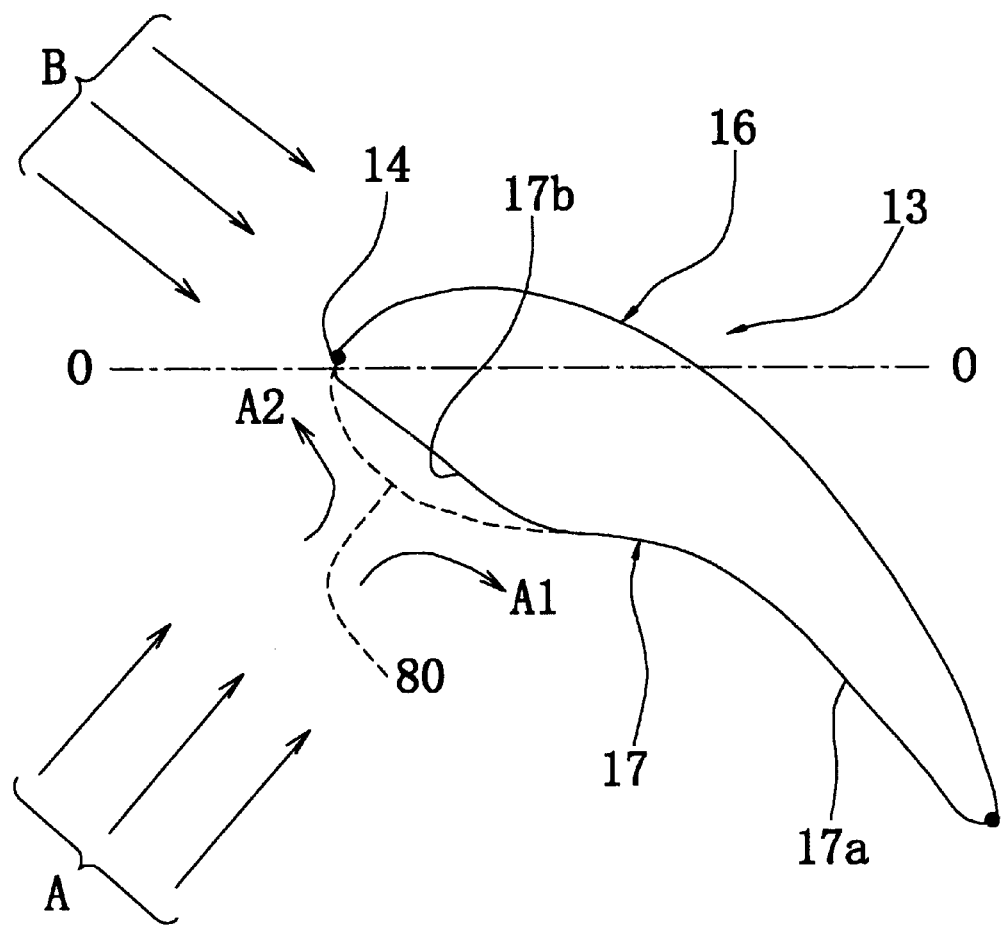
FIG. 3 is a cross section view of one of the stator blades of the stator depicted in FIGS. 2 and 3, taken along the line III—III in FIG. 2A, with a vector diagram superimposed thereon showing flow of working fluid with respect to the stator blade.

The stator blades 13 extend between the shell 11 and the core 12, and are located at equally circumferentially spaced apart positions, respectively. Each stator blade 13 couples the outer peripheral surface of the shell 11 and the inner peripheral surface of the core 12. Further, a peripheral surface of each stator blade 13 is formed with a blade tip 14, a blade trailing edge 15, a back 16 and a face 17, as is shown in FIG. 3. The dotted line in FIG. 3 represents the form or shape of a conventional stator blade.

The blade tip 14 defines an edge of the peripheral surface of the stator blade 13 proximate the turbine 5 (i.e., left edge in FIG. 3). The blade trailing edge 15 is an edge of the peripheral surface of the stator blade 13 proximate the impeller 4 (i.e., right edge in FIG. 3).

As shown in FIG. 3, the back 16 is defined on a peripheral surface of the stator blade 13 extending between the blade tip 14 and the blade trailing edge 15. The back 16 generally faces the impeller 4, and has a streamline contour. When the torque converter rotates in the forward direction, a high pressure is produced in a space upstream (proximate the blade tip 14), in the rotating direction with respect to the stator blade 13, and a low pressure is produced in a space downstream (proximate the trailing edge 15), in the rotating direction with respect to the stator blade 13. Therefore, the upstream side with respect to the stator blade 13 in the rotating direction is generally referred to as a "positive pressure side", and the downstream side with respect to the stator blade 13 in the rotating direction is generally referred to as a "negative pressure side". In this torque converter 1, the side of the stator blade 13 near the impeller 4 is the negative pressure side of the stator blade 13, and the side of the stator blade 13 near the turbine 5 is the positive pressure side of the stator blade 13.

The face 17 is a portion of the peripheral surface of the stator blade 13 extending between the blade tip 14 and the blade trailing edge 15 which generally faces the turbine 5, and is formed of a streamline portion 17a and a planar portion 17b. The planar portion 17b extends from proximate the blade tip 14 toward the streamline portion 17a. The conventional shape of a stator blade is indicated with a dashed line in FIG. 3.

Figure 4:
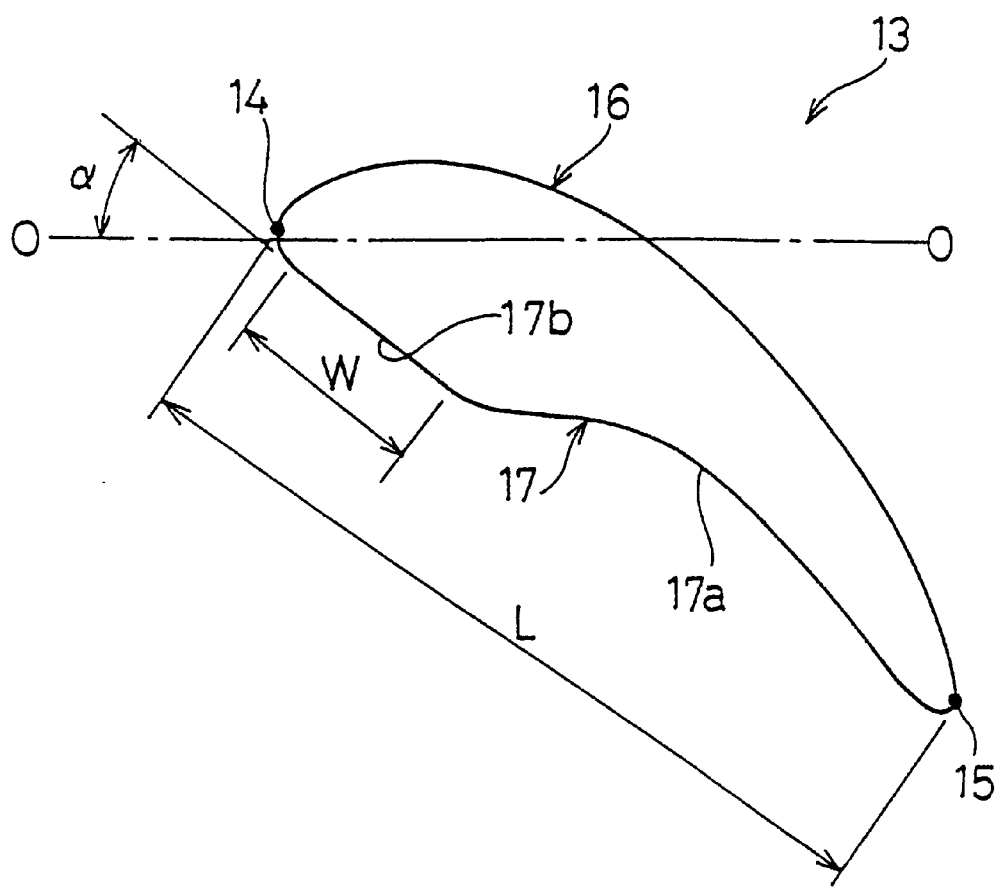
FIG. 4 is a view similar to FIG. 3, with indications of relative dimensions of the stator blade.

As shown in FIG. 4, a length between the blade tip 14 and the blade trailing edge 15 in the section is a chord length (L), and a width of the plane portion 17b measured in a direction perpendicular to the radial lines extending from the rotation axis O—O is a width (W). The chord length (L) and the width (W) establish the following relationship:

$$0.062 \leq W/L \leq 0.324$$

As shown in FIG. 4, an angle ($\alpha$) formed between a plane parallel to the plane portion 17b and the axis O—O is in a range satisfying the following relationship:

$$32° \leq \alpha \leq 61°$$

Description is now given on performance curves which depict the performance of the torque converter 1 provided with the stator blades 13 described above. The following terms are provided for a better understanding of the performance curves. The speed ratio (e) of a torque converter is the relationship between the speed of the impeller and the speed of the turbine. Specifically, the speed ratio (e) is defined as:

$$\text{speed ratio } (e) = No \div Ni$$

where (No) is the rotation speed of the turbine and (Ni) is the rotation speed of the impeller. It should be understood that at idle (no vehicle motion) the speed ratio (e) is equal to zero because the turbine is not rotating with the vehicle brakes applied.

The capacity coefficient (Cf) is defined as follows:

$$\text{capacity coefficient} = Ti \div Ni^2$$

where (Ti) is the torque of the impeller and (Ni) is the rotation speed of the impeller.

The shape and form of the stator blade of the present invention is such that the capacity coefficient (Cf) is lower than in the prior art when the speed ratio (e) is 0 (the automobile is not in motion—and is idling).

Figure 6:
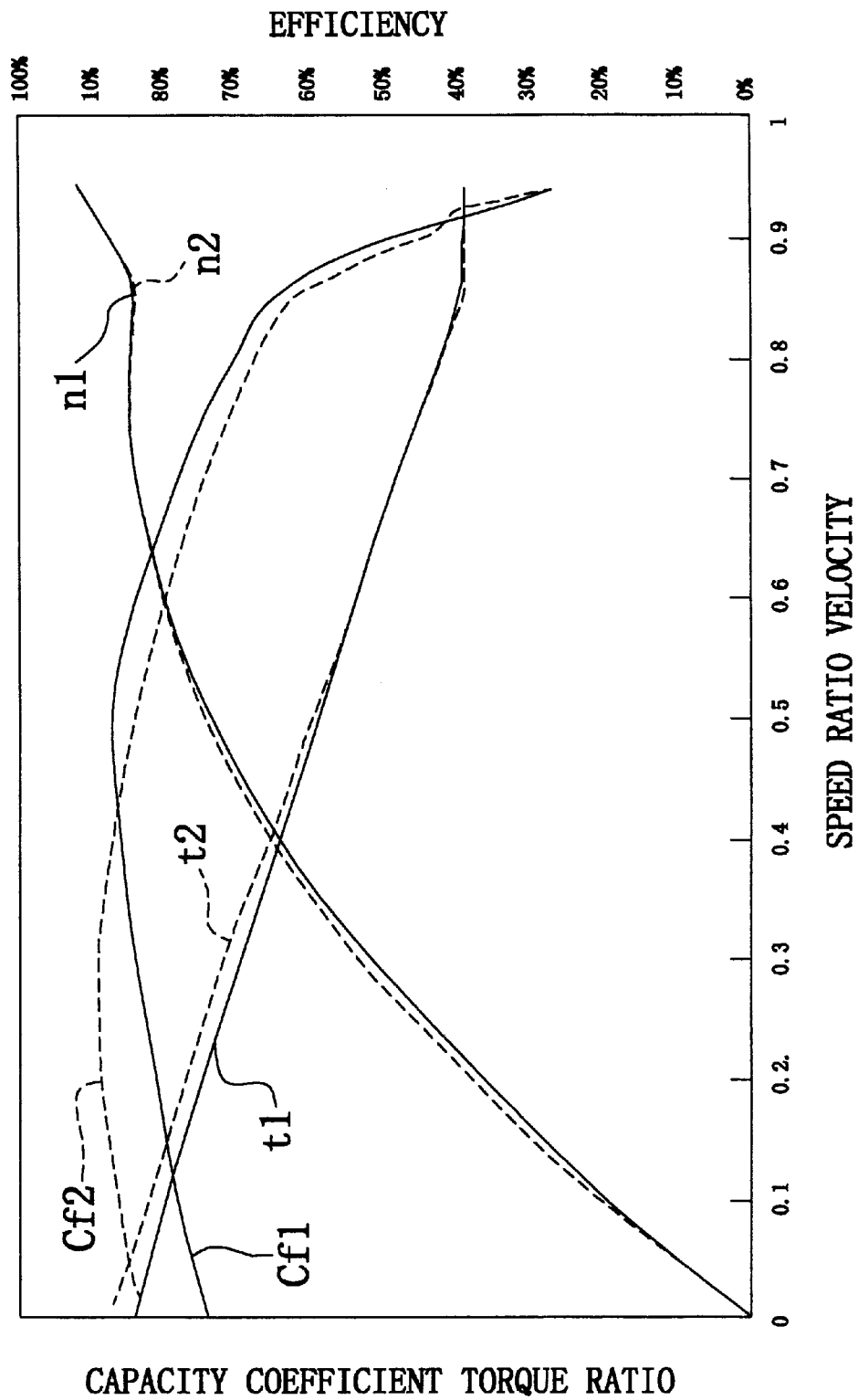
FIG. 6 shows performance curves of the torque converter provided with the stator blades of the present invention depicted in FIGS. 3 and 4.

The performance curves of the torque converter 1 are depicted with solid lines in FIG. 6. Dotted lines in FIG. 6 represent performance curves of the torque converter provided with conventional stator blades. Specifically, the dotted lines in FIG. 6 correspond to the stator blade shape depicted with dotted line in FIG. 3. The abscissa in FIG. 6 indicates the speed ratio (e). The ordinate indicates a capacity coefficient (Cf), a torque ratio (t) and an efficiency ($\eta$). The speed ratio (e) is defined by (rotation speed of turbine 5)/(rotation speed of impeller 4). The capacity coefficient (Cf) is defined by (torque of impeller 4)/(square of rotation speed of impeller 4). The torque ratio (t) is defined by (torque of turbine 5)/(torque of impeller 4). The efficiency ($\eta$) is defined by ((torque ratio (t))×(speed ratio (e))×100).

When the speed ratio (e) is 0, the capacity coefficient (Cf1) of torque converter 1 is smaller than the conventional capacity coefficient (Cf2). This is primarily because the working fluid of the torque converter 1 flows in the direction indicated by an arrow A in FIG. 3 when the speed ratio (e) is 0. Since the direction of the arrow A forms a large angle with respect to the plane extending between the blade tip 14 and the blade trailing edge 15, the working fluid flowing from the turbine 5 to the impeller 4 collides with the stator blades 13.

In the prior art, a stator blade 80, depicted in dotted lines in FIG. 3, is such that the working fluid collides with the streamline face portion, which neighbors to the blade tip 14 and has a convex contour which extends outward toward the turbine 5. The working fluid impacts against the blade tip of the prior art stator blade 80 and then flows toward the impeller along the streamline form of the face portion as indicated by arrows A1 and A2 in FIG. 3. In contrast to this, in the present invention, the torque converter 1 is provided with the stator blades 13 having the faces 17, each of which has the plane portion 17b near the tip 14, and therefore a large impact loss occurs in the working fluid when the working fluid collides with the stator blades 13. In the torque converter 1, the flow rate in the direction of the arrow A2, i.e., the flow rate of the working fluid flowing toward the turbine 5 is larger than that in the prior art. For the above reasons, the circulating speed of the working fluid and therefore the flow rate are lower than those in the prior art, and the capacity coefficient (Cf1) is small when the speed ratio (e) is 0.

Since the capacity coefficient (Cf1) of the torque converter 1 is small as described above, the vehicle provided with the torque converter 1 can have an improved fuel consumption during idling.

In the torque converter 1, the capacity coefficient (Cf1) in the middle and high speed ratio ranges is large (see the range of (e≧0.4) in FIG. 6), although the capacity coefficient (Cf1) is smaller than that in the prior art when the speed ratio (e) is small. One of the reasons for which the capacity coefficient (Cf1) is large in the middle and high speed ratio ranges is that the working fluid of the torque converter 1 flows in the direction indicated by an arrow B in FIG. 3 when the speed ratio is in the middle or high ranges. In the middle and high speed ratio ranges, the direction of the arrow B approaches the direction parallel to the plane portion 17b. This promotes flow of the working fluid from the turbine 5 side (left side in FIG. 3) toward the impeller 4 side (right side in FIG. 3) compared with the prior art.

This increase in capacity coefficient (Cf1) in the middle and high speed ratio ranges means that the engine speed is relatively low during driving of the vehicle drive in the middle and high speed ratio ranges, and therefore results in improvement of the fuel consumption and silence of the vehicle.

As shown in FIG. 6, the torque converter 1 can ensure the maximum efficiency which is equal to or higher than that in the prior art.

Figure 5:
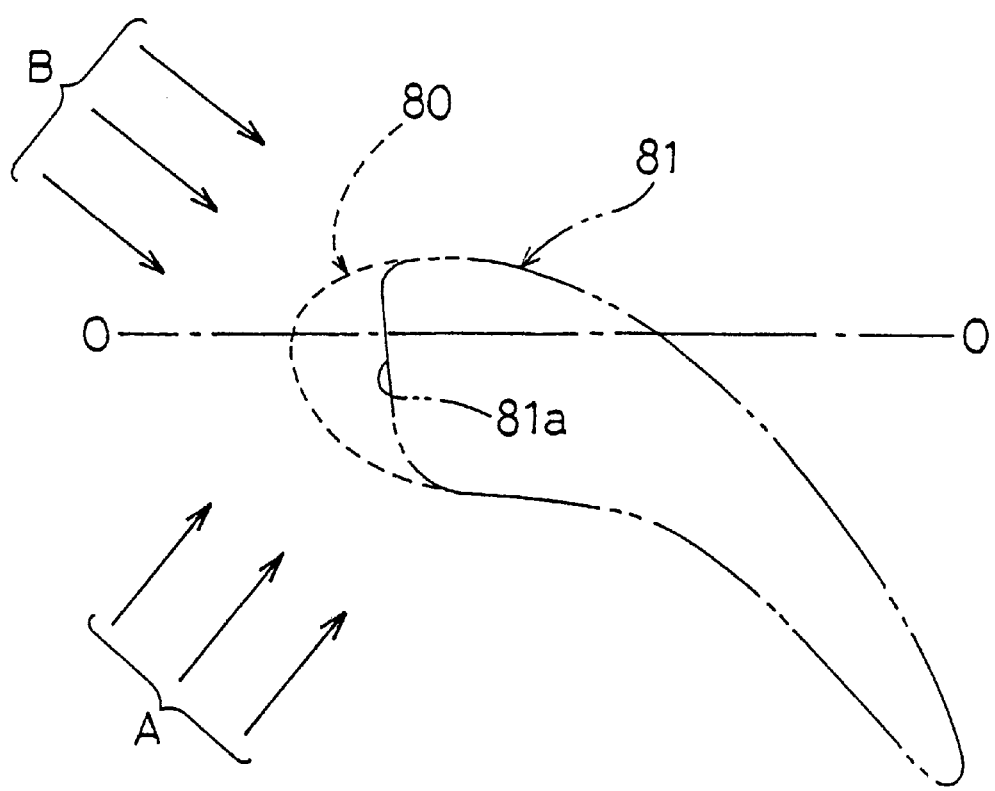
FIG. 5 is a view similar to FIG. 3 but shows a comparison of two different prior art stator blades with a vector diagram superimposed thereon showing flow of working fluid with respect to the prior art stator blades.

To further show the advantages of stator blade configuration of the present invention described above, description is now be given on performance curves of a torque converter which is provided with stator blades 81 having forms shown by alternate long and two short dashes line in FIG. 5. The prior art stator blade 80 is shown in dotted lines in FIG. 5. The stator blades 81 are disclosed in JP 9-14388, published Jan. 14, 1997.

Figure 7:
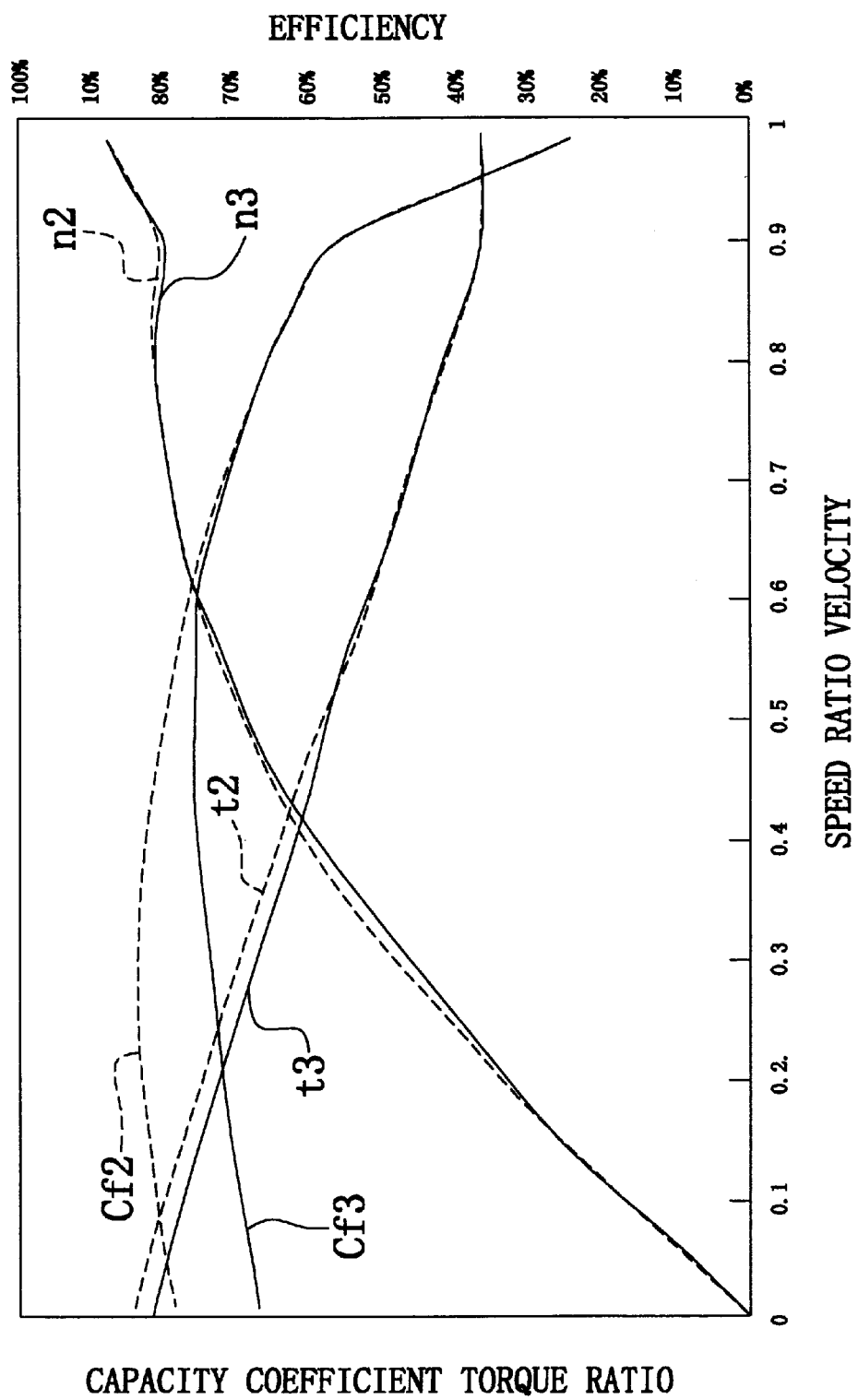
FIG. 7 shows performance curves of the torque converter provided with the stator blades depicted in FIG. 5 for reference and comparison.

The torque converter having stator blades 81 provides the performance curves depicted with solid lines in FIG. 7. Dotted lines in FIG. 7 represent the performance curves of the torque converter having the conventional stator blades 80 depicted with dotted line in FIG. 5. The form of the stator blade 81 can be obtained by cutting the blade tip portion of the conventional stator blade 81 to form a plane portion 81a.

When the speed ratio (e) is 0, the capacity coefficient (Cf3) of the torque converter provided with the stator blades 81 is smaller than the conventional capacity coefficient (Cf2). This is primarily because the working fluid flows in the direction of the arrow A in FIG. 5 when the speed ratio (e) is 0, and the direction of the arrow A forms a relatively large angle with respect to the plane portion 81a. Thus, the plane portion 81a disturbs the flow of working fluid, and lowers the capacity coefficient (Cf3).

The capacity coefficient (Cf3) of the torque converter provided with the stator blades 81 is also small when the speed ratio is in the middle or high speed ratio range (see FIG. 7). One of the reasons for which the capacity coefficient (Cf3) is small in the middle or high speed ratio range is that the working fluid flows in a direction of the arrow B in FIG. 5 when the speed ratio is in the middle or high range. It can be concluded that the flow of working fluid is disturbed, and the capacity coefficient (Cf3) lowers, because the direction of the arrow B forms a relatively large angle with respect to the plane portion 81a. The lowering of the capacity coefficient (Cf3) in the middle and high speed ratio ranges means that the engine speed is high during driving of the vehicle in the middle and high speed ratio ranges, resulting in deterioration of the fuel consumption and the silence of the vehicle.

In the torque converter having the stator blades 81, as shown in FIG. 7, the torque ratio (t3) is lower than that in the prior art stator blade 80, and the maximum efficiency is likewise lower than that in the prior art.

Returning to the present invention, the stator support structure of the torque converter 1 is described below.

The stator support structure is formed of a one-way clutch mechanism 21 and an annular retainer 22. The one-way clutch mechanism 21 is a mechanism allowing rotation of the stator 6 only in one direction, and is formed of an outer race 23, an inner race 25 and a clutch member 24 disposed between these races. The outer race 23 is fixed to the inner peripheral portion of the shell 11. The side portions of the outer and inner races 23 and 25 near the engine are in contact with the retainer 22, which is carried on the turbine hub 8 via a thrust roller bearing 26. The turbine hub 8 is fixed to the inner peripheral portion of the turbine 5. The other side portions of the outer and inner races 23 and 25 near the transmission are in contact with the thrust support 11a of the shell 11, and the thrust support 11a is carried on the impeller hub 4a via the thrust roller bearing 27. The impeller hub 4a is fixed to the inner peripheral portion of the impeller 4. As described above, the thrust roller bearings 26 and 27 restrict movement of the shell 1 of the stator 6 and the stator support structure in the direction of the axis O—O between the impeller hub 4a and the turbine hub 8. The inner race 25 is provided at its inner periphery with a spline aperture 25a engaged with the stator shaft (not shown).

According to the present invention, a generally planar portion is formed on a portion of the face of the stator blade near the blade tip. During idling, therefore, the impact loss of the working fluid is large, and the circulating flow speed of the working fluid and therefore the flow rate are low so that the capacity coefficient (Cf) with the speed ratio (e) of 0 is small. Thereby, the fuel consumption of the vehicle during idling is improved. In addition to the above, provision of the plane portion at the face near the turbine can suppress disturbance of the flow of the working fluid in the middle and high speed ratio ranges. Therefore, the efficiency of the torque converter can be maintained.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A stator blade of a stator disposed between an impeller and a turbine in a torque converter, the stator blade comprising:

a blade tip near said turbine;

a blade trailing edge near said impeller;

a back surface extending between said blade tip and said blade trailing edge, a substantial portion of said back surface facing said impeller, said back surface having a convex streamline contour; and a face extending between said blade tip and said blade trailing edge, said face facing said turbine, said face having a concave streamline portion and a planar portion, said planar portion being defined between said blade tip and said concave streamline portion; and wherein:

a chord length (L) is defined by a distance between said blade tip and said blade trailing edge;

a width (W) of said planar portion is measured in a direction perpendicular to a radially extending line extending perpendicular to an axis of rotation of the torque converter, said width (W) and said chord length (L) defining a relationship:

$$0.04 \leq (W/L) \leq 0.4.$$

2. The stator blade according to claim 1, wherein an angle is defined between an axis of rotation of the torque converter and said planar portion, said angle being in a range of from 25 degrees to 70 degrees.

3. A stator blade of a stator disposed between an impeller and a turbine in a torque converter, said stator blade comprising:

a blade tip near said turbine;

a blade trailing edge near said impeller;

a back surface extending between said blade tip and said blade trailing edge, located on a negative pressure side of said stator blade, and having a convey streamline contour;

a face extending between said blade tip and said blade trailing edge, located on a positive pressure side of said stator blade, said face having a concave streamline portion and a planar portion, said planar portion being defined between said blade tip and said concave streamline portion; and wherein:

a chord length (L) is defined by a distance between said blade tip and said blade trailing edge;

a width (W) of said planar portion is measured in a direction perpendicular to a radially, extending line extending perpendicular to an axis of rotation of the torque converter, said width (W) and said chord length (L) defining a relationship:

$$0.04 \leq (W/L) \leq 0.4.$$

4. The stator blade according to claim 3, wherein an angle is defined between an axis of rotation of the torque converter and said planar portion, said angle being in a range of from 25 degrees to 70 degrees.

5. A torque converter comprising:

a front cover configured for connection to an output member of an engine;

an impeller fixed to said front cover, said front cover and said impeller defining chamber for working fluid;

a turbine disposed in said chamber, said turbine facing said impeller, said turbine being configured for connection to a shaft extending from a transmission; and a stator having a plurality of stator blades, each of said stator blades disposed between an inner peripheral portion of said impeller and an inner peripheral portion of said turbine, each of said stator blades comprising:

a blade tip near said turbine;

a blade trailing edge near said impeller;

a back surface extending between said blade tip and said blade trailing edge, located on a negative pressure side of said stator blade, and having a convex streamline contour;

a face extending between said blade tip and said blade trailing edge, located on a positive pressure side of said stator blade, said face having a concave streamline portion and a planar portion, said planar portion being defined between said blade tip and said concave streamline portion; and wherein:

a chord length (L) is defined by a distance between said blade tip and said blade trailing edge;

a width (W) of said planar portion is measured in a direction, perpendicular to a radially extending line extending perpendicular to an axis of rotation of the torque converter, said width (W) and said chord length (L) defining a relationship:

$$0.04 \leq (W/L) \leq 0.4.$$

6. The torque converter according to claim 5, wherein an angle is defined between an axis of rotation of the torque converter and said planar portion, said angle being in a range of from 25 degrees to 70 degrees.

* * * * *